United States Patent [19]

Isobe

[11] Patent Number: 5,570,673

[45] Date of Patent: Nov. 5, 1996

[54] INTERNAL COMBUSTION ENGINE CONTROL APPARATUS

[75] Inventor: Daiji Isobe, Toyohashi, Japan

[73] Assignee: Nippondenso Co., Ltd., Kariya, Japan

[21] Appl. No.: 561,385

[22] Filed: Nov. 21, 1995

[30] Foreign Application Priority Data

Dec. 13, 1994 [JP] Japan .................................. 6-333045

[51] Int. Cl.[6] .................................................. F02D 41/00
[52] U.S. Cl. ............................................................ 123/688
[58] Field of Search .................................. 123/688, 682, 123/698, 690, 696

[56] References Cited

U.S. PATENT DOCUMENTS

| | | | |
|---|---|---|---|
| 5,143,040 | 9/1992 | Okawa et al. ........................... | 123/684 |
| 5,237,983 | 8/1993 | Willey et al. ............................ | 123/688 |
| 5,245,978 | 9/1993 | Orzel ....................................... | 123/674 |
| 5,423,203 | 6/1995 | Namiki et al. ............................ | 73/1 G |
| 5,426,934 | 6/1995 | Hunt et al. ................................ | 60/276 |
| 5,433,185 | 7/1995 | Toyoda .................................... | 123/682 |
| 5,499,617 | 3/1996 | Kitajima et al. ......................... | 123/698 |

FOREIGN PATENT DOCUMENTS

| | | | |
|---|---|---|---|
| 57-146041 | 9/1982 | Japan ..................................... | 123/688 |
| 59-561 | 1/1984 | Japan ..................................... | 123/688 |

*Primary Examiner*—Raymond A. Nelli
*Attorney, Agent, or Firm*—Cushman, Darby & Cushman

[57] ABSTRACT

Internal combustion engine control apparatus determines activation status of the $O_2$ sensor and feasibility of feedback control. If the $O_2$ sensor is activated and the feedback control is feasible, the apparatus computes a corrected fuel injection duration TAU based on feedback control using detected $O_2$ concentration. For EGR control, the apparatus selects one of the two maps to retrieve EGR valve opening data based on the feasibility of feedback control, thus achieving an EGR flow in accordance with the selected air-fuel ratio control mode. The combination of the air-fuel ratio control and the EGR control achieves reduction of harmful exhaust gas components and stabilization of engine operation during an initial period after the start of engine operation.

9 Claims, 17 Drawing Sheets

FIG. 8
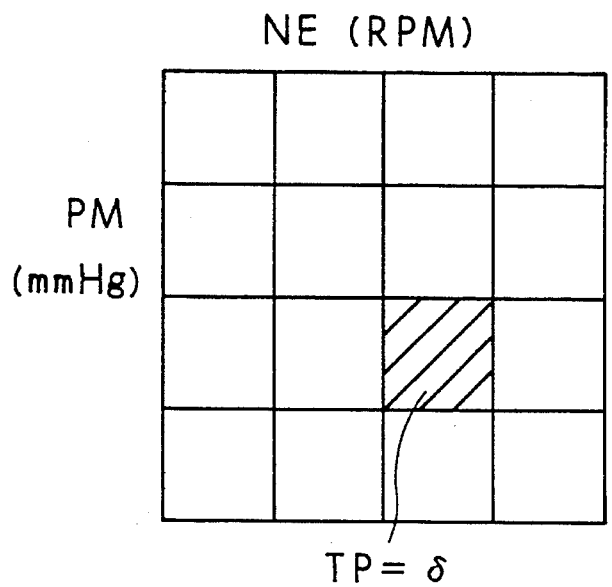
FIG. 9A
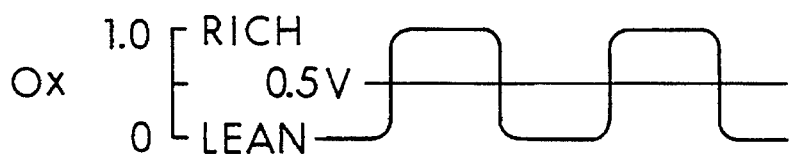
FIG. 9B
FIG. 9C
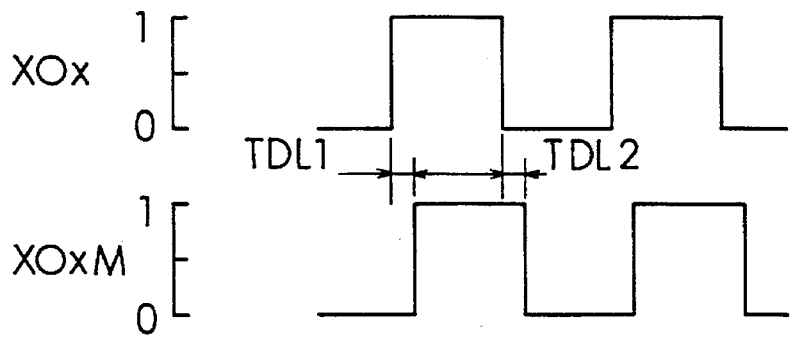
FIG. 9D
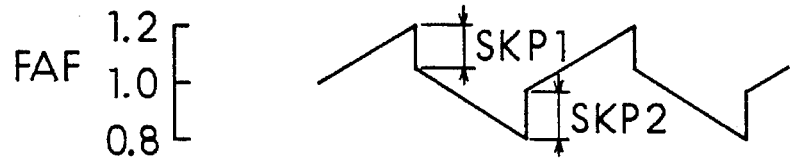

MAP OF SEGRB1

SEGRB = α

MAP OF SEGRB2

SEGRB = β

INTERNAL COMBUSTION ENGINE CONTROL APPARATUS

CROSS REFERENCE TO RELATED APPLICATION

This application is based on Japanese Patent Application No. 6-333045 filed on Dec. 13, 1994, the content of which is incorporated herein by reference.

BACKGROUND OF THE INVENTION

1. Field of the Invention

The present invention relates to an internal combustion engine control apparatus that performs air-fuel ratio control and exhaust gas recirculation (EGR) control and, more specifically, to an internal combustion engine control apparatus that performs control such that harmful components are reduced in the exhaust gas entering a catalyzer before the catalyzer is activated.

2. Description of Related Art

Various type of internal combustion engine control apparatuses are disclosed in, for example, Japanese patent application unexamined publication Nos. SHO 57-146041 and SHO 59-561.

Each of the apparatuses disclosed in those publications has an EGR valve provided for controlling communication between the exhaust system and the intake system. The apparatus according to the publication No. SHO 57-146041 keeps the EGR valve open from the start of engine operation until the catalyzer temperature reaches such a level as to activate the catalyzer, and closes the EGR valve when such a high temperature is reached. On the other hand, the apparatus according to the publication No. 59-561 keeps the EGR valve open for a predetermined length of time from the start of engine operation, and closes the EGR valve when the predetermined length of time elapses.

Each of the apparatuses is intended to reduce harmful components in the exhaust gas entering the catalyzer before it is activated, thus reducing the harmful components in the exhaust gas emission from the exhaust system.

The apparatuses also perform air-fuel ratio control based on the $O_2$ concentration in exhaust gas detected by an $O_2$ sensor provided in the exhaust system.

These conventional apparatuses have the following problems.

Although combustion of air-fuel mixture largely depends on temperature during a certain period of time from the start of engine operation, the conventional apparatuses do not change the flow of EGR introduced into the combustion chamber. Such EGR control may sometimes result in engine stall.

The $O_2$ sensor does not properly function until the temperature of an $O_2$ concentration detecting element reaches a predetermined level to activate the element. Therefore, appropriate air-fuel ratio control cannot be performed for a certain period of time from the start of engine operation until the $O_2$ concentration detecting element is activated. Naturally, during such a period, harmful components in exhaust gas cannot be sufficiently reduced.

SUMMARY OF THE INVENTION

The present invention is intended to solve the foregoing problems of the conventional art and has its object of the present invention to provide an internal combustion engine control apparatus capable of further reducing harmful exhaust gas components and stabilizing engine operation during an initial period following start of engine operation.

According to a first aspect of the present invention, an internal combustion engine control apparatus promotes activation of an $O_2$ sensor for detecting the $O_2$ concentration in exhaust gas in order to quickly enable normal air-fuel ratio control, and determines whether the $O_2$ sensor is activated. When the $O_2$ sensor becomes activated, air-fuel ratio control is switched to air-fuel ratio control modes. In a period from the start of engine operation until the $O_2$ sensor becomes activated, during which the $O_2$ concentration cannot be used as feedback data, an open-loop control is performed instead of feedback control. After the $O_2$ sensor is activated, the detected $O_2$ concentration is fed back to perform air-fuel ratio control in accordance with changes in the air-fuel ratio. Exhaust gas recirculation control is pre-optimized for the two air-fuel ratio control modes.

It is preferred that after the $O_2$ sensor is activated, the output from the $O_2$ sensor be used as a basis for the air-fuel ratio control to achieve the stoichiometric (theoretical) air-fuel ratio.

According to a second aspect of the invention, there is provided an internal combustion engine control apparatus which promotes activation of an $O_2$ sensor to quickly achieve feedback control over air-fuel ratio. It is determined whether an $O_2$ sensor and a catalyzer are activated, respectively. The apparatus performs different optimal engine controls for an initial period from the start of engine operation until the $O_2$ sensor becomes activated, for the following period from the activation of the $O_2$ sensor until the catalyzer becomes activated, and after the activation of the catalyzer.

More specifically, during the initial period, the air-fuel ratio control is performed based on a predetermined air-fuel ratio change pattern, without using the $O_2$ concentration feedback. During the following period, the air-fuel ratio control means performs feedback control to maintain the air-fuel ratio to the fuel-lean side based on the $O_2$ concentration linearly detected by a linear $O_2$ sensor, and the flow of exhaust gas recirculation is controlled in accordance with the air-fuel ratio feedback control being performed to achieve fuel-lean mixture. After activation of the catalyzer, the air-fuel ratio is feedback controlled to achieve the stoichiometric ratio, and the flow of exhaust gas recirculation is controlled in accordance with the air-fuel ratio feedback control being performed to achieve stoichiometric mixture.

According to a third aspect of the invention, there is provided an internal combustion engine control apparatus which determines whether an $O_2$ sensor is activated. During a period from the start of engine operation until the $O_2$ sensor becomes activated, during which the $O_2$ concentration cannot be fed back, exhaust gas recirculation control is performed in accordance with an air-fuel ratio change pattern predetermined experimentally, based on determination of sensor activation.

It is preferred to detect the temperature of a coolant of the internal combustion engine, and correct the flow of exhaust gas recirculation by reducing the flow depending on the coolant temperature. More specifically, if the coolant temperature is lower than a second predetermined point, the flow of exhaust gas recirculation is reduced to increase fuel in order to facilitate combustion. If the coolant temperature is higher than a first predetermined point, the flow of exhaust gas recirculation, which is significantly hot, is reduced to prevent undesired temperature rise.

BRIEF DESCRIPTION OF THE DRAWINGS

The foregoing and further objects, features and advantages of the present invention will become apparent from the following description of preferred embodiments with reference to the accompanying drawings, wherein:

FIG. 8 illustrates a two-dimensional map regarding fuel injection amount;

FIGS. 9A to 9D are timing charts indicating feedback correction values;

DETAILED DESCRIPTION OF THE PREFERRED EMBODIMENTS

Preferred embodiments of the present invention will be described hereinafter with reference to the accompanying drawings.

Embodiment 1

Figure 1:
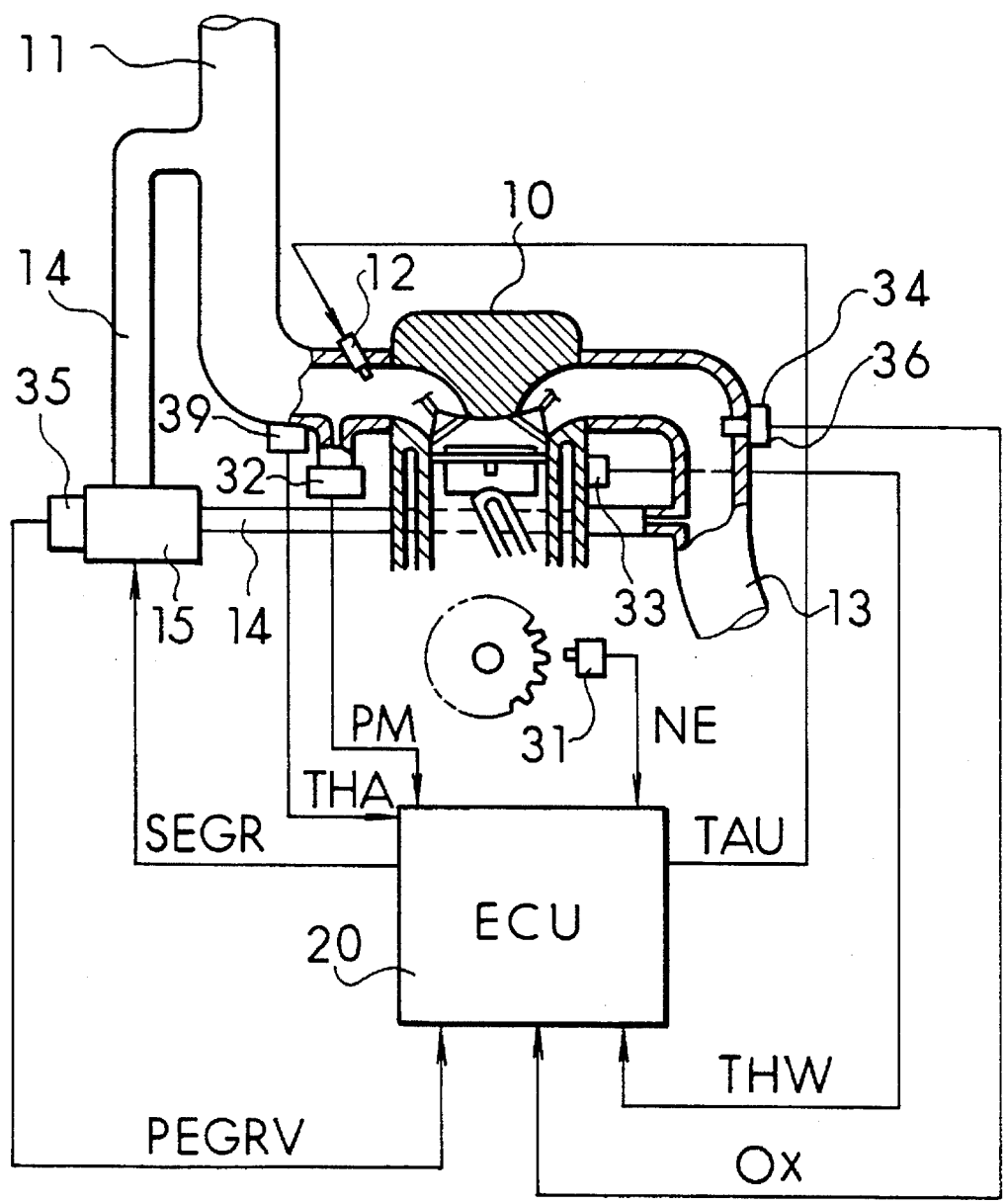
FIG. 1 is a schematic diagram of an internal combustion engine according to a first embodiment of the internal combustion engine control apparatus of the present invention.
Figure 2:
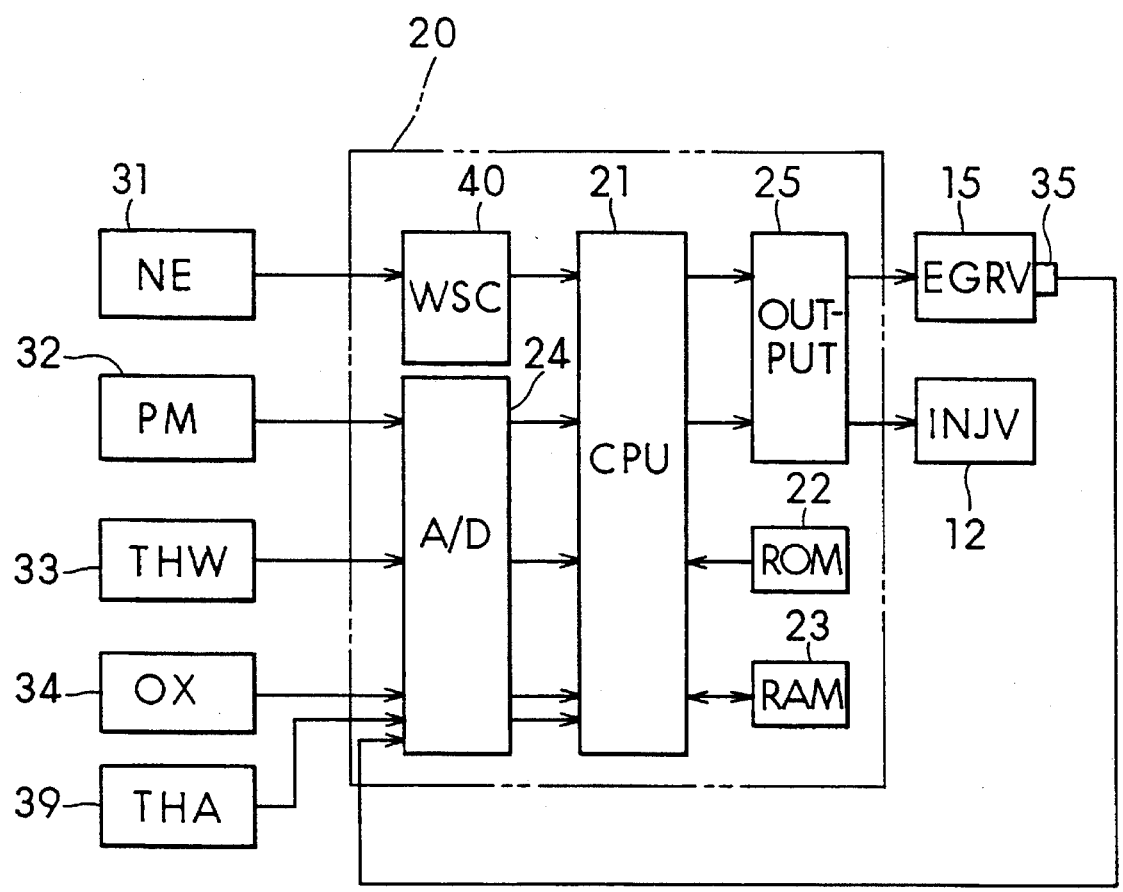
FIG. 2 is a block diagram of the embodiment as shown in FIG. 1.

FIG. 1 schematically illustrates an internal combustion engine according to a first embodiment of the internal combustion engine control apparatus of the invention. FIG. 2 schematically shows a circuitry construction of the first embodiment.

Referring to FIGS. 1 and 2, an intake pipe 11 of an internal combustion engine (hereinafter, simply referred to as "engine") 10 is provided with a fuel injection valve 12. The intake pipe 11 is connected to an EGR passage 14 that is connected to an exhaust pipe 13 for recirculating a part of exhaust gas into the intake pipe 11. The EGR passage is provided with an EGR valve 15 that is operated by an electric actuator such as a stepping motor. An ECU (electronic control unit) 20 performs drive control of the fuel injection valve 12 and the EGR valve 15 based on outputs from various sensors.

Referring particularly to FIG. 2, the ECU 20 is mainly composed of a CPU (central processing unit) 21, a ROM 22 that stores control programs, a RAM 23 for storing various kinds of data, an A/D converter 24 for converting the analog signals from sensors to digital values, and an outputting circuit 25 for operating the fuel injection valve 12 and the EGR valve 15 based on signals of fuel injection duration TAU and EGR valve opening SEGR from the CPU 21, respectively.

The ECU 20 is connected to various sensors. A rotational angle sensor 31 outputs a signal indicating engine speed NE, synchronously with an rotational angle of the crank shaft of the engine 10. An intake pressure sensor 32 detects a negative pressure in the intake pipe 11 and outputs a signal indicating intake pipe pressure PM. A coolant temperature sensor 33 detects the temperature of coolant of the engine 10 and outputs a signal indicating coolant temperature THW. An intake temperature sensor 39 is provided in the intake pipe 11 for detecting the temperature in the intake pipe 11 and outputting a signal indicating intake temperature THA. An $O_2$ sensor 34 is provided in the exhaust pipe 13 for detecting $O_2$ concentration in the exhaust pipe 13 and outputting an $O_2$ concentration signal Ox. An EGR valve opening sensor 35 is connected to the EGR valve 15 to detect the opening degree of the EGR valve 15 and output a signal indicating EGR valve opening PEGRV. The rotational angle sensor 31 is connected to the CPU 21 via a waveform shaping circuit 40. The other sensors 32 through 35 and 39 are connected to the CPU 21 via the A/D converter 24.

The $O_2$ sensor 34 is provided with a heater 36 acting as sensor activation promoting means. When the engine 10 is started, the CPU 20 instructs to energize the heater 36 to promote temperature rise in the $O_2$ sensor 34. According to this embodiment, the heater 35 is composed of electric heating wire. Other types of electric heater, for example, a sheath current heater, may be used as the promoting means.

The air-fuel ratio control and the EGR control according to this embodiment will be described in conjunction with the control programs.

Figure 3:
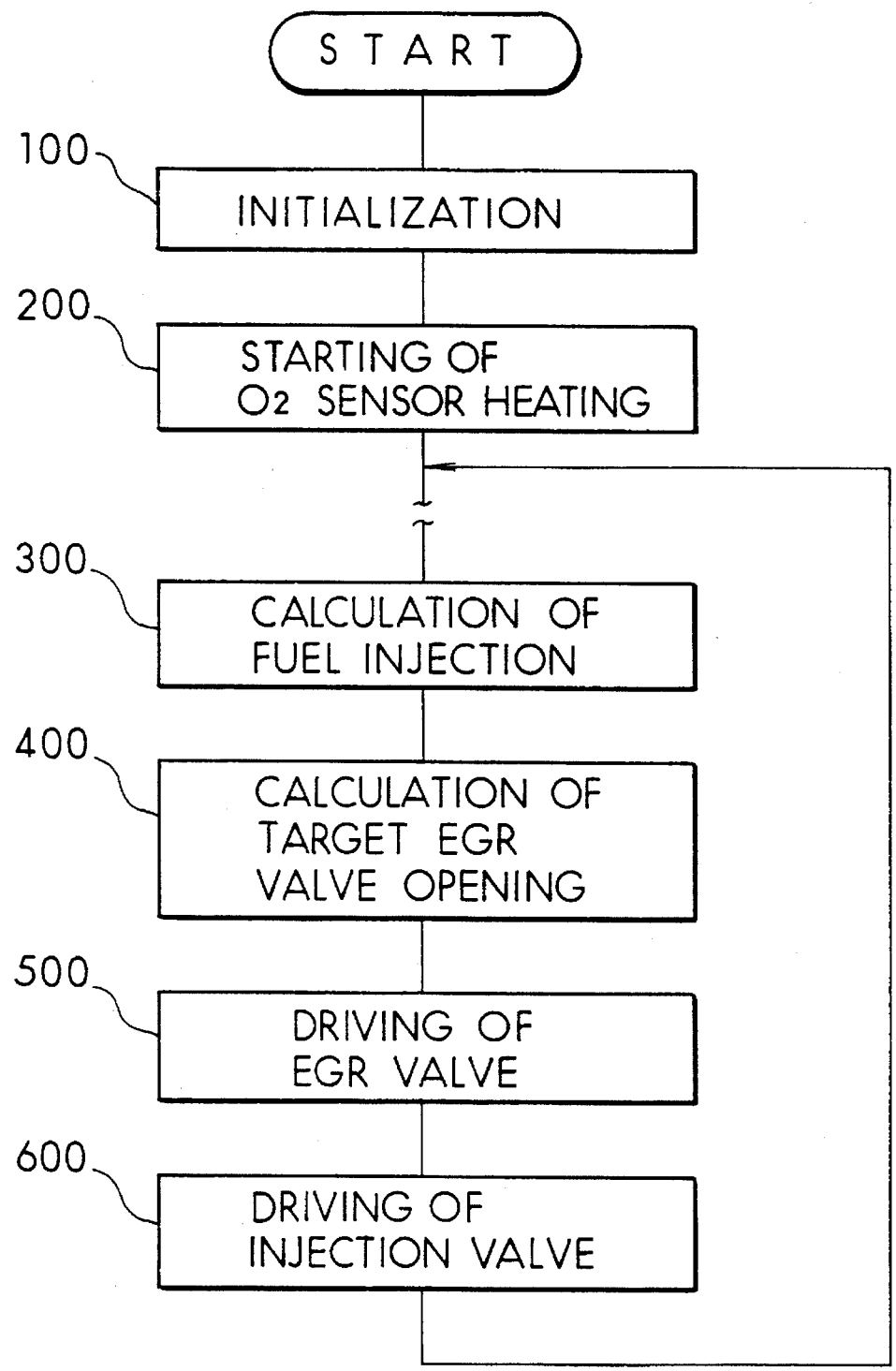
FIG. 3 is a flowchart of a basic control routine.

The CPU 2 executes a basic routine as illustrated in FIG. 3.

When supplied with electricity, the CPU 21 performs initialization in Step 100. During the initialization, the CPU 21 sets up variable numeral areas of the RAM 23 and the like, and checks signals from the sensors. After the initialization, the CPU 21 starts supplying electricity to the heater 36 provided in the $O_2$ sensor 34 in Step 200. The heater 34 can activate the O₂ sensor 34 substantially independently of the exhaust gas temperature.

After this preparatory processing, main processing is repeated in a loop. The flowchart in FIG. 3 mainly focuses on processings for the air-fuel ratio control and the EGR control. In Step 300, the CPU 21 calculates an amount of fuel to be injected to achieve an air-fuel ratio corresponding to the operational conditions of the engine 10. Step 400 calculates a target EGR valve opening in a conditional range where EGR control is required. Step 500 accordingly drives the EGR valve 15 to achieve the target EGR valve opening. Step 600 drives the fuel injection valve 12 so as to provide the fuel injection amount calculated in Step 300. Calculation of fuel injection amount (Step 300) and calculation of EGR valve opening (Step 400) are executed every 40 ms. The operation of the EGR valve 15 and the operation of the fuel injection valve (Steps 500, 600) are executed every 4 ms.

The fuel injection amount is determined based on fuel injection duration TAU.

Figure 4:
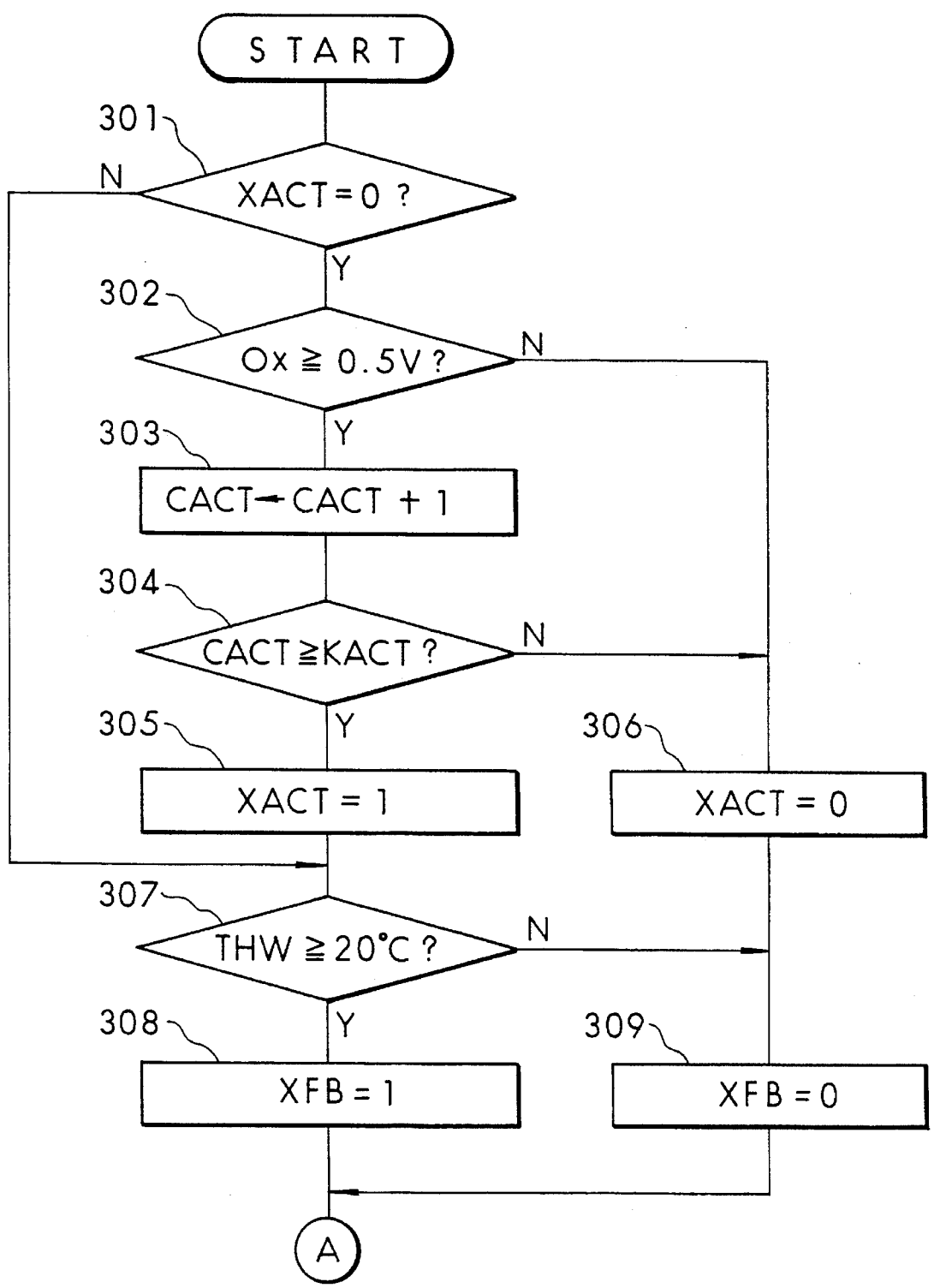
FIG. 4 is a flowchart of an air-fuel ratio control processing.
Figure 5:
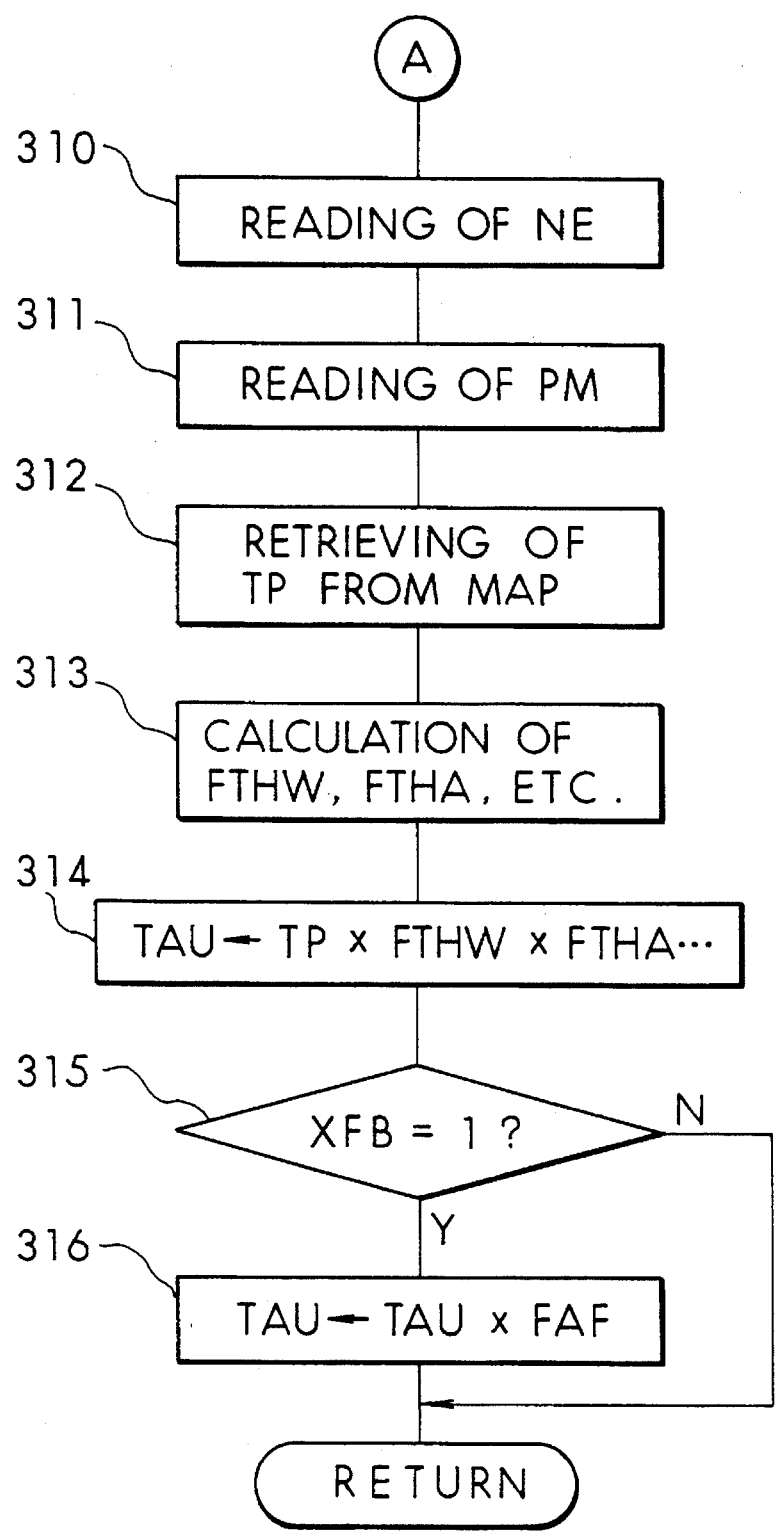
FIG. 5 is a continuing flowchart of the air-fuel ratio control processing.

Calculation of fuel injection duration TAU, required for the air-fuel ratio control, is executed as illustrated in the flowcharts of FIGS. 4 and 5. For the air-fuel ratio control which will be described later with reference to FIG. 5, a basic fuel injection duration TP is first calculated based on the engine speed and the negative pressure in the intake pipe 11. The basic fuel injection duration TP is then corrected based on the coolant temperature, the intake air temperature and the like, which affect combustion. The fuel injection duration is also corrected by feedback control using the O₂ concentration in the exhaust pipe 13. The O₂ concentration feedback control is needed for correction in connection with aging changes or individual variations of the engine.

According to this embodiment, it is first determined whether the feedback control using the O₂ sensor 34 is feasible or possible.

Since the O₂ sensor 34 becomes activated or operative when the temperature reaches a predetermined point, the O₂ sensor 34 cannot be used for the air-fuel ratio control immediately after the engine 10 is started. It is only after activation of the O₂ sensor 34 that O₂ concentration output from the O₂ sensor 34 can be used for the control. According to this embodiment, an activation flag XACT is used to indicate the status of the O₂ sensor 34. The activation flag XACT is set to "0" when initialized, and is set to "1" when the O₂ sensor 34 becomes activated.

Figure 6A:
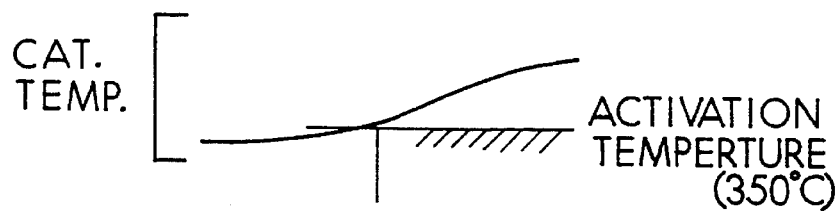
FIGS. 6A to 6C are timing charts for a starting period of engine operation.
Figure 6B:
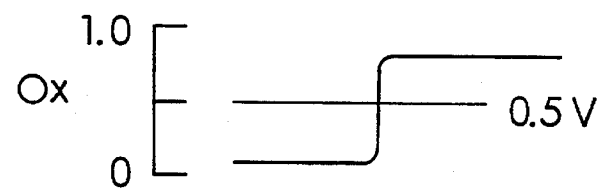
Figure 6C:
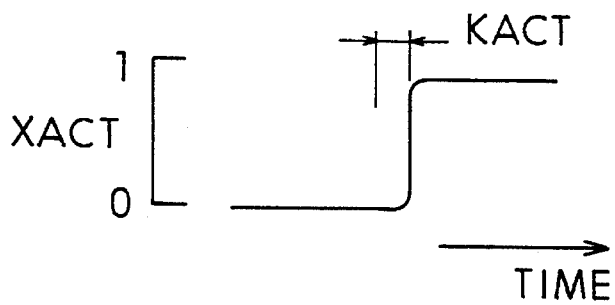
Figure 7:
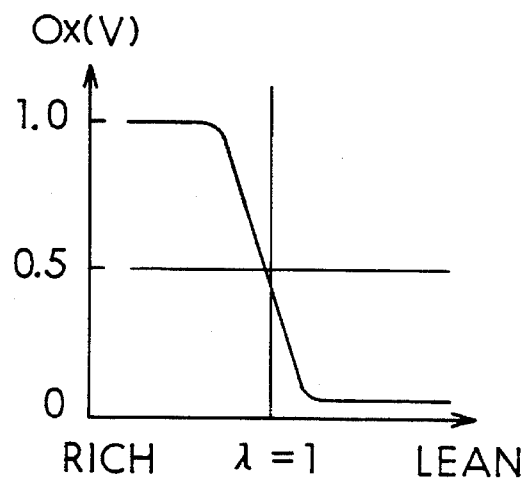
FIG. 7 is a graph indicating characteristics of an $O_2$ sensor.

To find out whether the O₂ sensor 34 is activated, the CPU 21 refers to the activation flag XACT in Step S301. If the activation flag XACT does not indicate activation of the O₂ sensor 34 (XACT="0"), the CPU 21 refers to the level of O₂ concentration signal Ox from the O₂ sensor 34. The level of the O₂ concentration signal Ox remains approximately at 0 V when not yet activated as indicated in FIG. 6B. After being activated, the O₂ sensor 34 outputs approximately 1.0 V if the sensor 34 detects an O₂ concentration less than a predetermined reference value (that is, the air-fuel mixture is rich ($\lambda$<1), and the sensor 34 outputs approximately 0 V if it detects an O₂ concentration detected not less than the predetermined reference value (that is, the mixture is lean ($\lambda$>1). Here, the expression $\lambda$=1 indicates the stoichiometric air-fuel ratio. Since the air-fuel ratio is in the fuel-rich side during an initial period because of engine warm-up when the temperature is still low, the status of the O₂ sensor 34 is determined in Step 302 based on determination on whether the level of the O₂ concentration signal Ox is less than 0.5 V (the activation reference value). However, because the signal level of 0.5 V or higher does not immediately mean stabilized activation of the O₂ sensor 34, a predetermined length of time is allowed to elapse for stabilization of the sensor 34 before it is finally determined that the O₂ sensor 34 is activated. To count this stabilization time, a variable CACT is increased by 1 in Step 303 every execution cycle of the loop for fuel injection amount calculation. The step 304 compares the variable CACT with a fixed value KACT that is predetermined in accordance with the stabilization time. If the variable CACT equals or exceeds the fixed value KACT, it is determined that the O₂ sensor 34 is activated. Then, Step 305 assigns "1" to the activation flag XACT. In this processing, if the level of the O₂ concentration signal is lower than the activation reference value, that is, 0.5 V, or if the variable CACT is less than the fixed value KACT, the CPU 21 assigns "0" to the activation flag XACT for confirmation in Step 306.

The activation of the O₂ sensor 34 alone does not enable feedback control. Temperature condition must also be satisfied to perform feedback control. According to this embodiment, a feedback permission flag XFB is used as a basis for determining whether feedback control is to be performed. If it is determined in Step 301 that the O₂ sensor 34 is activated (activation flag XACT=1), Step 307 determines whether the coolant temperature THW detected by the coolant temperature sensor 33 equals or exceeds 20 degrees Celsius. If the coolant temperature THW is 20 degrees Celsius or higher, the CPU 21 assigns "1" to the feedback permission flag XFB in Step 308. If the coolant temperature THW is lower than 20 degrees Celsius, the flag XFB is set to "0" in Step 309.

After the activation flag XACT and the feedback permission flag XFB are set up through the above-described processing, the fuel injection duration TAU is calculated in processing from Step 310 to Step 316 in the flowchart of FIG. 5.

The CPU 21 inputs current engine speed NE and current intake pipe pressure PM in Steps 310 and 311. The CPU 21 then refers to a map as shown in FIG. 8 to retrieve a basic fuel injection duration TP corresponding to the inputted engine speed NE and intake pipe pressure PM in Step 312. The data correspondence of the map is predetermined through experiments such that given data of engine speed NE and intake pipe pressure PM and the corresponding basic fuel injection duration TP will provide for $\lambda$=1. Step 313 calculates correction coefficients FTHW and FTHA for correction based on coolant temperature, intake temperature and the like. Step 314 multiplies the basic fuel injection duration TP by the correction coefficients FTHW and FTHA to give a fuel injection duration TAU. According to this embodiment, the basic fuel injection duration TP may be multiplied only by the correction coefficient FTHW based on coolant temperature THW to provide a fuel injection duration TAU. The correction coefficients used are optimal values that are predetermined through experiments. To obtain such optimal correction coefficients during processing, the CPU 21 uses a predetermined map or formula.

Step 315 refers to the feedback permission flag XFB to determine whether feedback control is permitted. If it is permitted, Step 316 corrects the fuel injection duration TAU by multiplying by a feedback correction value FAF.

The process of calculating the feedback correction value FAF will be described with reference to FIGS. 9A to 9D. Basically, the feedback correction value FAF is determined with reference to the O₂ concentration in the exhaust pipe 13 in such a manner that when the air-fuel ratio shifts from the lean (fuel lean) side to the rich (fuel rich) side, the fuel injection amount decreases, and when the air-fuel ratio shifts from the rich side to the lean side, the fuel injection amount increases.

More specifically, the feedback correction value FAF is varied from the reference value 1.0 as follows. First, a flag XOx is determined based on determination on whether the level of the $O_2$ concentration signal from the $O_2$ sensor 34 is lower than 0.5 V. Then, the flag XOx is delayed to determine a flag XOxM by applying a delay value TDL1 to the 0-to-1 switch timing of the flag XOx and applying a delay value TDL2 to the 1-to-0 switch timing of the flag XOx. When the flag XOxM indicates a lean mixture (XOxM=0), the feedback correction value FAF is added with a predetermined integral value INT1 to increase the feedback correction value FAF. When the flag XOxM indicates a rich mixture (XOxM=0), the feedback correction value FAF is added with another predetermined integral value INT2 to reduce the feedback correction value FAF. To improve control response and reduce vibrations, skip values are added to the feedback correction value FAF as follows. When the flag XOxM switches from "0" to "1", a skip value SKP1 is added to skippingly reduce the feedback correction value FAF. When the flag XOxM switches from "1" to "0", another skip value SKP2 is added to skippingly increase the feedback correction value FAF.

The delay values TDL1, TDL2, the integral values INT1, INT2, and the skip values SKP1, SKP2 will substantially eliminate the effects of the engine's aging changes, individual variations, or the like. These values can easily be determined through experiments.

If it is determined in Step S315 that feedback is not permitted, the fuel injection duration TAU obtained in Step 314 is used for the following processing. The processing using the fuel injection correction coefficient FAF that is not multiplied by the feedback correction value FAF means execution of the open loop control (i.e., FAF=1).

After the fuel injection duration TAU, that is, a factor required for the air-fuel ratio control, is determined as described above, a target EGR valve opening is determined for the EGR control. The target EGR valve opening is an EGR valve opening value needed to achieve an optimal EGR flow in accordance with the operational conditions of the engine 10. To respond to changes in the operational conditions, a two-dimensional map of target EGR valve opening data is predetermined based on the engine speed and the intake pipe pressure, and a target EGR valve opening data read from the map is corrected on the basis of the coolant temperature and the like.

Figure 11:
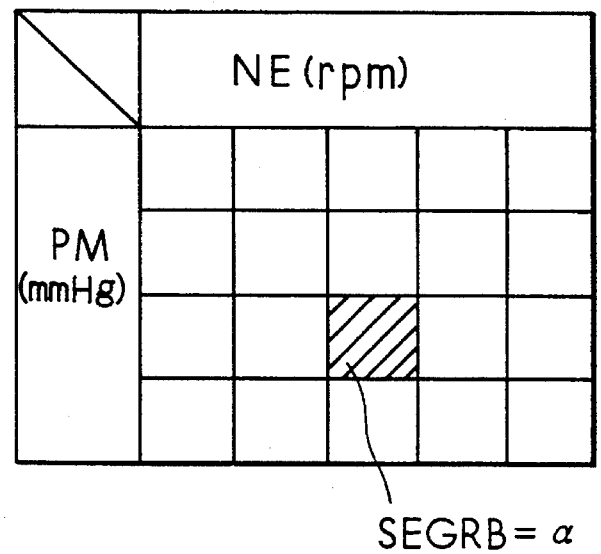
FIG. 11 illustrates a two-dimensional map regarding EGR valve opening.
Figure 12:
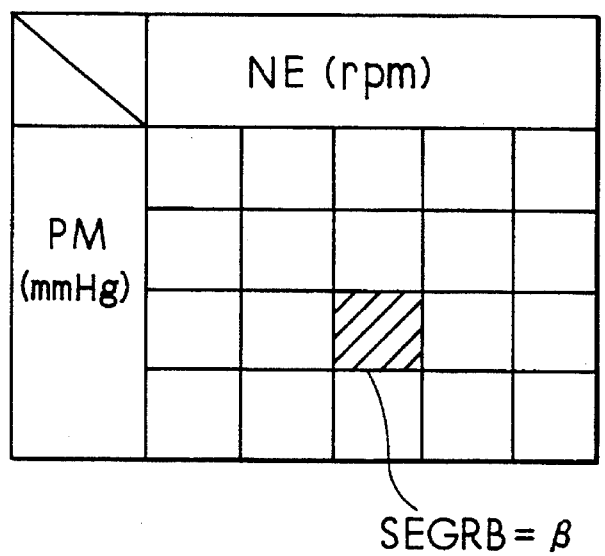
FIG. 12 illustrates another two-dimensional map regarding EGR valve opening.

This embodiment employs two two-dimensional EGR valve opening maps as shown in FIGS. 11 and 12. FIG. 11 shows a first basic EGR valve opening SEGRB1 map that is predetermined through experiments in which the engine 10 is operated under conditions that the coolant temperature is 80 degrees Celsius and other operational conditions are determined so as to achieve $\lambda=1$ (the stoichiometric air-fuel ratio). FIG. 12 shows a second basic EGR valve opening SEGRB2 map that is predetermined in accordance with operational conditions where the open loop air-fuel ratio control is performed, in particular, low-temperature initial operational conditions where the mixture is fuel-rich. The CPU 21 selectively uses one of the two maps in accordance with the operational conditions.

Figure 10:
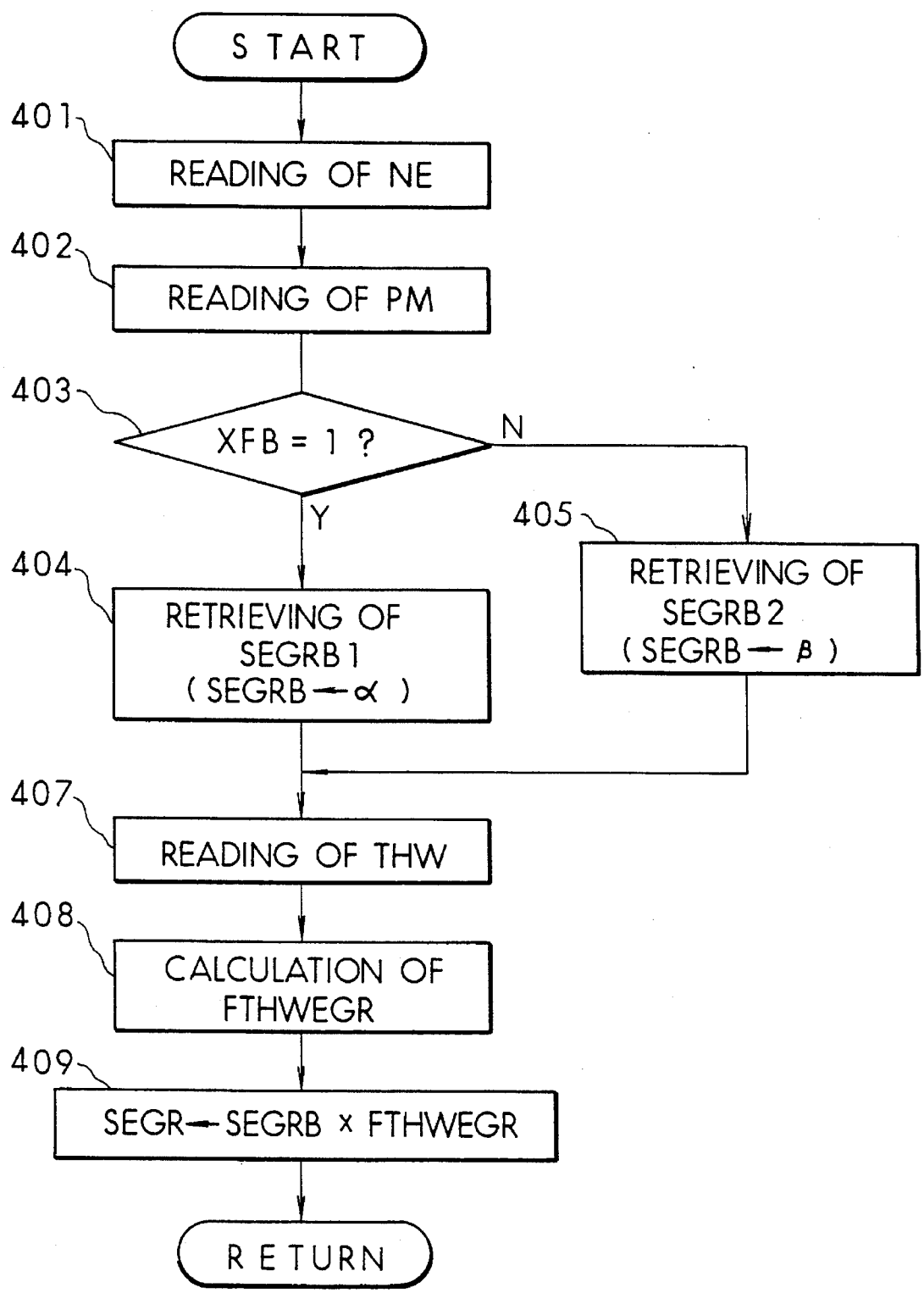
FIG. 10 is a flowchart of a processing to determine EGR valve opening.

The maps are used as shown in the flowchart of FIG. 10. After the current engine speed NE and the current intake pipe pressure PM are inputted in Steps 401 and 402, the CPU 21 refers in Step 403 to the feedback permission flag XFB to determine whether the feedback control has been permitted, thus determining which of the maps to be used for the following processing. If the feedback control has been permitted (that is, the air-fuel ratio is maintained at $\lambda=1$), the processing proceeds to Step 404 to retrieve a valve opening $\alpha$ from the first basic EGR valve opening SEGRB1 map and substitute the valve opening $\alpha$ in the EGR valve opening SEGRB. If the feedback control has not been permitted, the map predetermined in accordance with the initial operational conditions is used. That is, Step 405 retrieves a valve opening $\beta$ from the second basic EGR valve opening SEGRB2 map and substitutes the valve opening $\beta$ in the EGR valve opening SEGRB. Thus, the CPU 21 selectively uses an EGR valve opening $\alpha$ determined corresponding to the feedback air-fuel ratio control where $\lambda=1$ is to be maintained, or an EGR valve opening $\beta$ determined corresponding to the open-loop air-fuel ratio control where a fuel-rich ratio is to be maintained.

Figure 13:
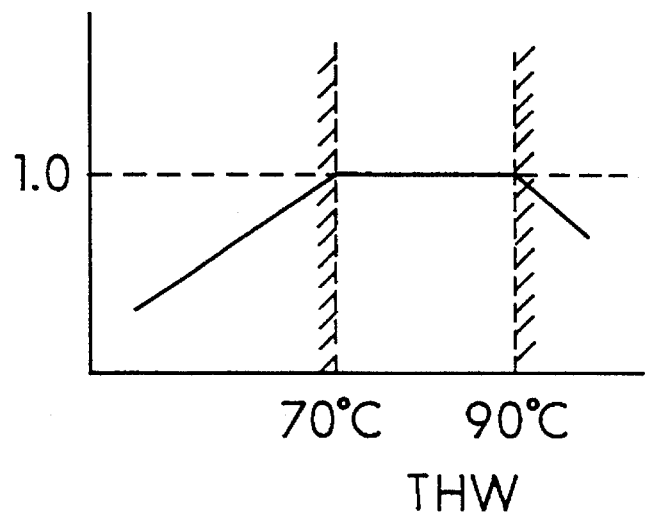
FIG. 13 is a graph indicating characteristics of the coolant temperature correction value.
Figure 14:
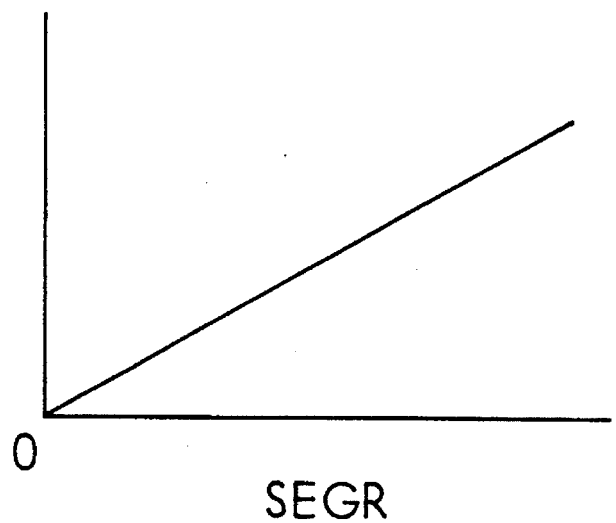
FIG. 14 is a graph indicating the relation between the target EGR valve opening and the EGR flow.

Then, the current coolant temperature THW is inputted in Step 407. Step 408 determines a coolant temperature correction value FTHWEGR. Correction based on the coolant temperature is performed as follows. A reference water temperature range is determined around, for example, 80 degrees Celsius. When the coolant temperature is lower than 70 degrees Celsius (which normally occurs in the warm-up operation), the EGR flow is reduced to stabilize combustion. When the coolant temperature is higher than 90 degrees Celsius, the EGR flow is also reduced to reduce the effect of the EGR flow on the intake temperature increase, thus avoiding engine knocking. To perform this control, the embodiment employs a coolant temperature correction value FTHWEGR map based on the coolant temperature THW as shown in FIG. 13. In this map, the coolant temperature correction value FTHWEGR decreases from 1.0 as the coolant temperature THW decreases below 70 degrees Celsius, and the coolant temperature correction value FTHWEGR also degreases from 1.0 as the coolant temperature THW increases over 90 degrees Celsius. Step 409 obtains a target EGR valve opening SEGR by multiplying the EGR valve opening SEGRB by the coolant temperature correction value FTHWEGR read from the map. The relation between the target EGR valve opening SEGR and the EGR flow is generally proportional as indicated in the graph of FIG. 14.

Figure 15:
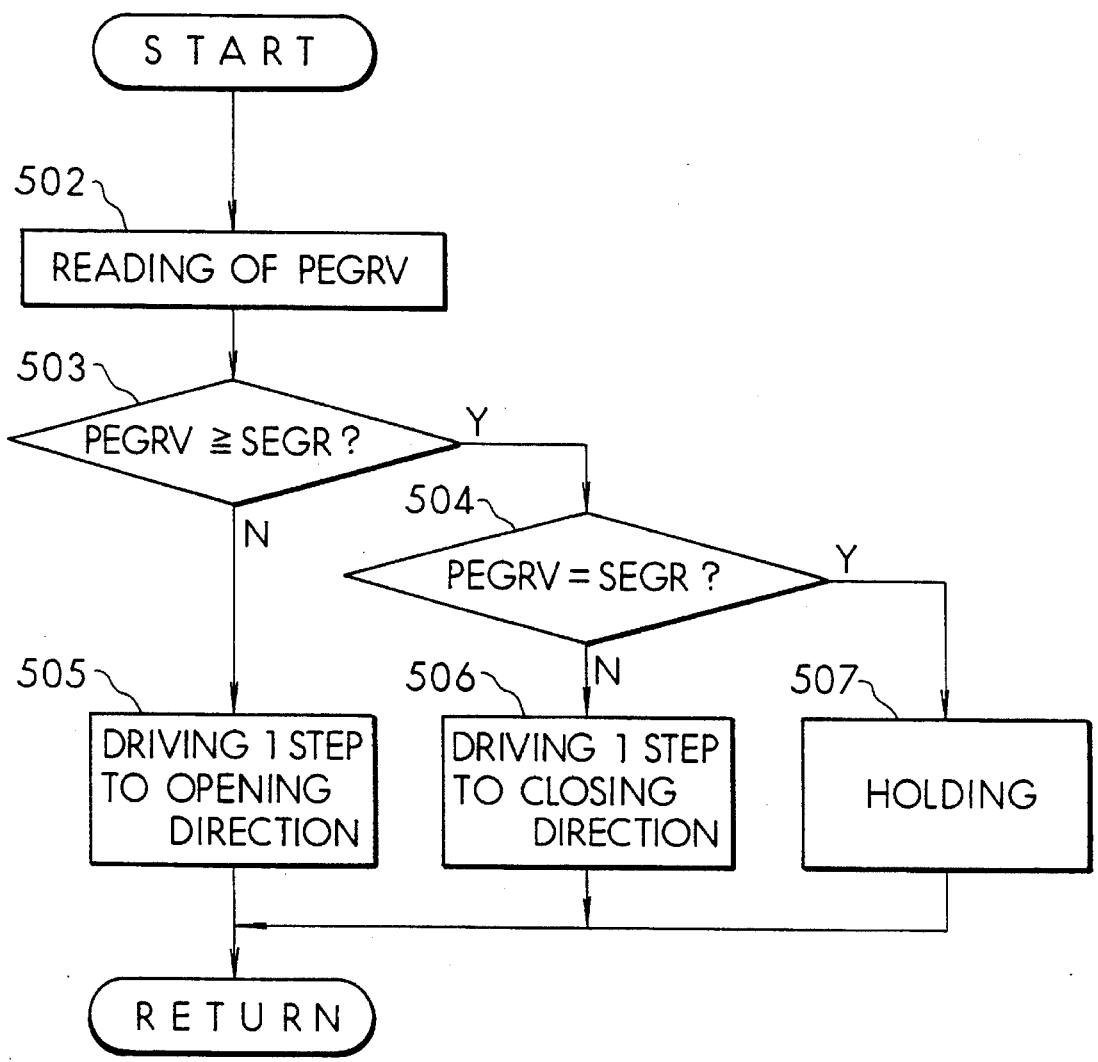
FIG. 15 is a flowchart of an EGR valve drive control processing.
Figure 16:
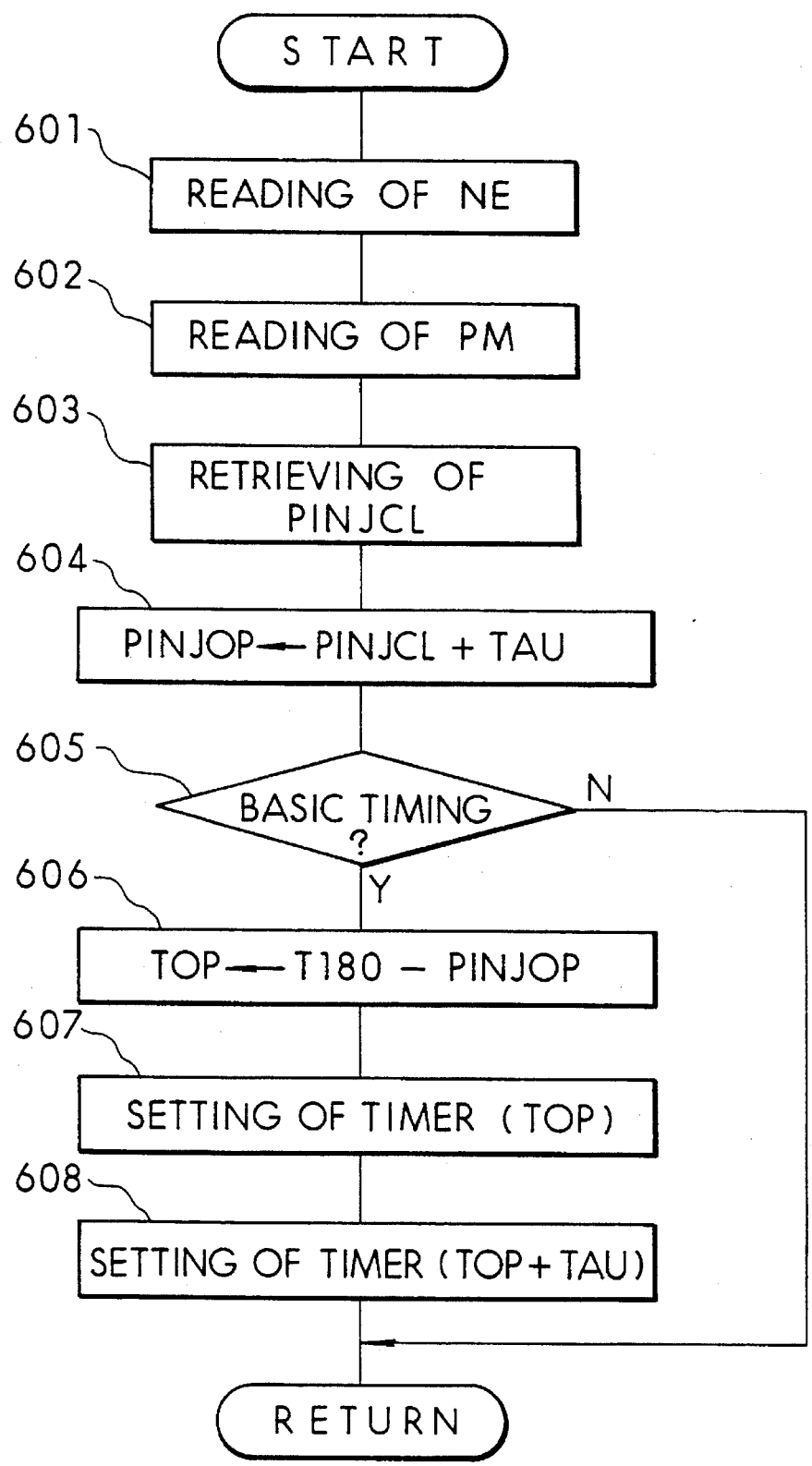
FIG. 16 is a flowchart of a fuel injection valve drive control processing.

After the fuel injection period TAU and the target EGR valve opening SEGR are calculated as described above, the EGR valve 15 and the fuel injection valve 12 are operated based on these values as illustrated in the flowcharts of FIG. 15 and 16, respectively.

FIG. 15 illustrates the processing for controlling the EGR valve 15 based on the target EGR valve opening SEGR.

Basically, the stepping motor of the EGR valve 15 is driven so that the EGR valve opening detected by the EGR valve opening sensor 35 connected to the EGR valve 15 equals the target EGR valve opening. In Step 502, the CPU 21 inputs a current EGR valve opening PEGRV based on a signal from the EGR valve opening sensor 35. The EGR valve opening REGRV is compared with the target EGR valve opening SEGR in Step 503, and Step 504 if necessary, to select the following processing for controlling the stepping motor. More specifically, if it is determined in Step 503 that the EGR valve opening PEGRV is less than the target EGR valve opening, the processing proceeds to Step 505 where the stepping motor is driven 1 LSB (1 increment step according to this embodiment) in the opening direction. If it is determined in Step 504 that the EGR valve opening PEGRV is greater than the target EGR valve opening, the processing proceeds to Step 506 where the stepping motor is driven 1 LSB (1 increment step according to this embodiment) in the closing direction. If it is determined in Step 504 that the EGR valve opening PEGRV equals the target EGR valve opening, the processing proceeds to Step 507 where the stepping motor is not driven but held in the current position to maintain the current EGR valve opening PEGRV.

The control processing for the fuel injection valve 12 will then be described. The fuel injection valve 12 is caused to inject fuel during a period between a fuel injection start timing and a fuel injection end timing. The fuel injection end timing must primarily be determined in accordance with the combustion cycle of the engine. The fuel injection start timing is then determined based on the fuel injection end timing.

Figure 17:
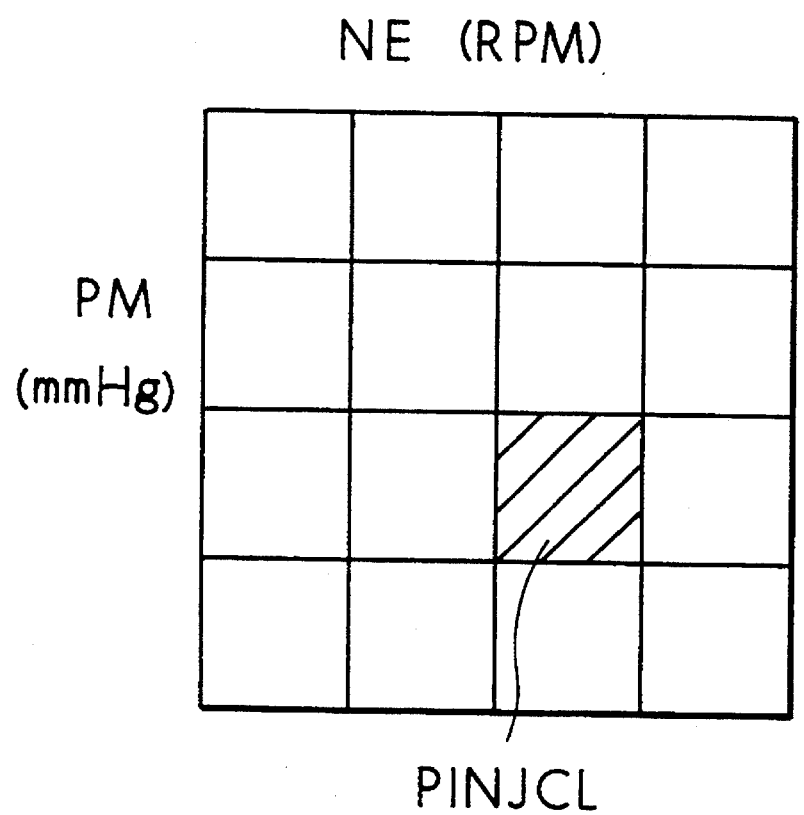
FIG. 17 illustrates a two-dimensional map regarding the closing timing of the fuel injection valve.

Referring to the flowchart of FIG. 16, after the current engine speed NE and the current intake pipe pressure PM are inputted in Steps 601 and 602, the CPU 21 retrieves in Step 603 a fuel injection valve closing time PINJCL from a map based on the engine speed NE and intake pipe pressure PM as shown in Fig. 17. Step 604 determines a fuel injection valve opening time PINJOP by adding the fuel injection duration TAU to the valve closing time PINJCL (PINJOP←PINJCL+TAU).

Figure 18A:
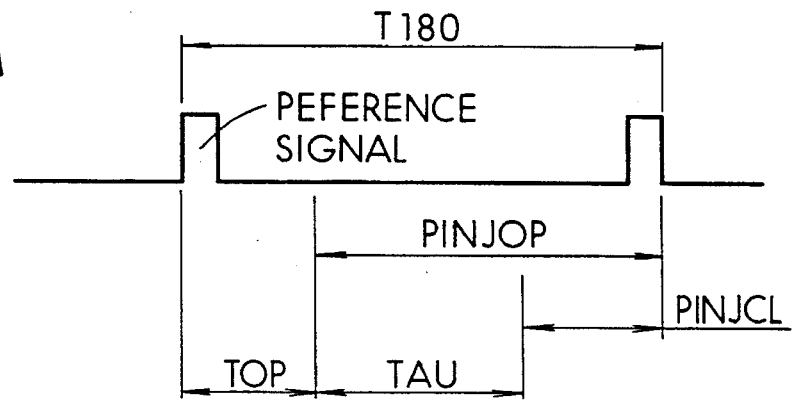
FIGS. 18A and 18B are timing charts regarding fuel injection.
Figure 18B:
Figure 19A:
FIGS. 19A to 19E are timing charts regarding fuel injection.
Figure 19B:
Figure 19C:
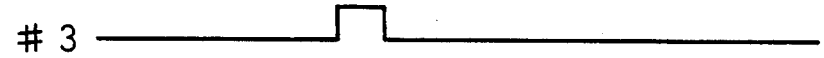
Figure 19D:
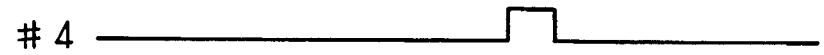
Figure 19E:
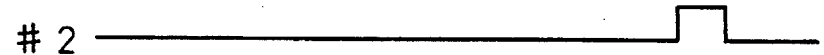

As indicated in the timing charts of FIGS. 18A and 18B, the valve opening timing TOP is determined by subtracting the valve opening time PINJOP from a pulse interval T180 of the reference signal for each cylinder. The pulse interval T180 is expressed herein in terms of time corresponding to a pulse interval of 180° CA.

It is determined in Step 605 whether the current crank angle equals the crank angle to start fuel injection control processing (that is, the basic timing) with respect to the fuel injection valve 12 for any of the cylinders, and if it is determined that it does, the concerned fuel injection valve 12 is selected (see FIGS. 19A to 19E indicating the reference signal for the cylinders and the corresponding sequence of driving the fuel injection valves 12 of the cylinders). Step 606 determines a valve opening timing TOP by subtracting the valve opening time PINJOP from the reference signal pulse interval T180. A fuel injection valve opening timer and a fuel injection valve closing timer for driving the fuel injection valve 12 in Steps 607 and 608, respectively. By this routine, an interruption is instructed to inject fuel from the fuel injection valve 12 for the fuel injection duration TAU starting at the valve opening timing TOP.

As described above, this embodiment determines whether the O$_2$ sensor has been activated (Steps 301 to 306), determines whether the feedback control is feasible (or has been permitted) (Steps 307 to 309), and if the O$_2$ sensor has been activated and the feedback control has been permitted, computes a fuel injection duration TAU based on feedback control correction. Furthermore, the embodiment select one of the EGR valve opening maps according to the determination on whether the feedback control has been permitted (Step 403). The EGR control is thus performed to achieve an optimal EGR flow in accordance with the air-fuel ratio control.

It can be seen from another stand point that the switching over the EGR control modes is performed corresponding to the switching over the air-fuel ratio control modes, that is, the open-loop control and the feedback control. As the air-fuel ratio becomes closer to the stoichiometric ratio, the combustion becomes more stable and the effect of the EGR control increases. In addition, it is a normal practice that the open-loop air-fuel ratio control is performed to achieve fuel-rich ratios in order to increase driveability and avoid engine stall. Since this embodiment promotes activation of the O$_2$ sensor, the embodiment can achieve the stoichiometric air-fuel ratio in an increased range of operational conditions, and will increase the overall exhaust gas temperature, thus leading to promoted activation of the catalyzer and increased catalyzer cleaning efficiency.

Embodiment 2

Figure 20:
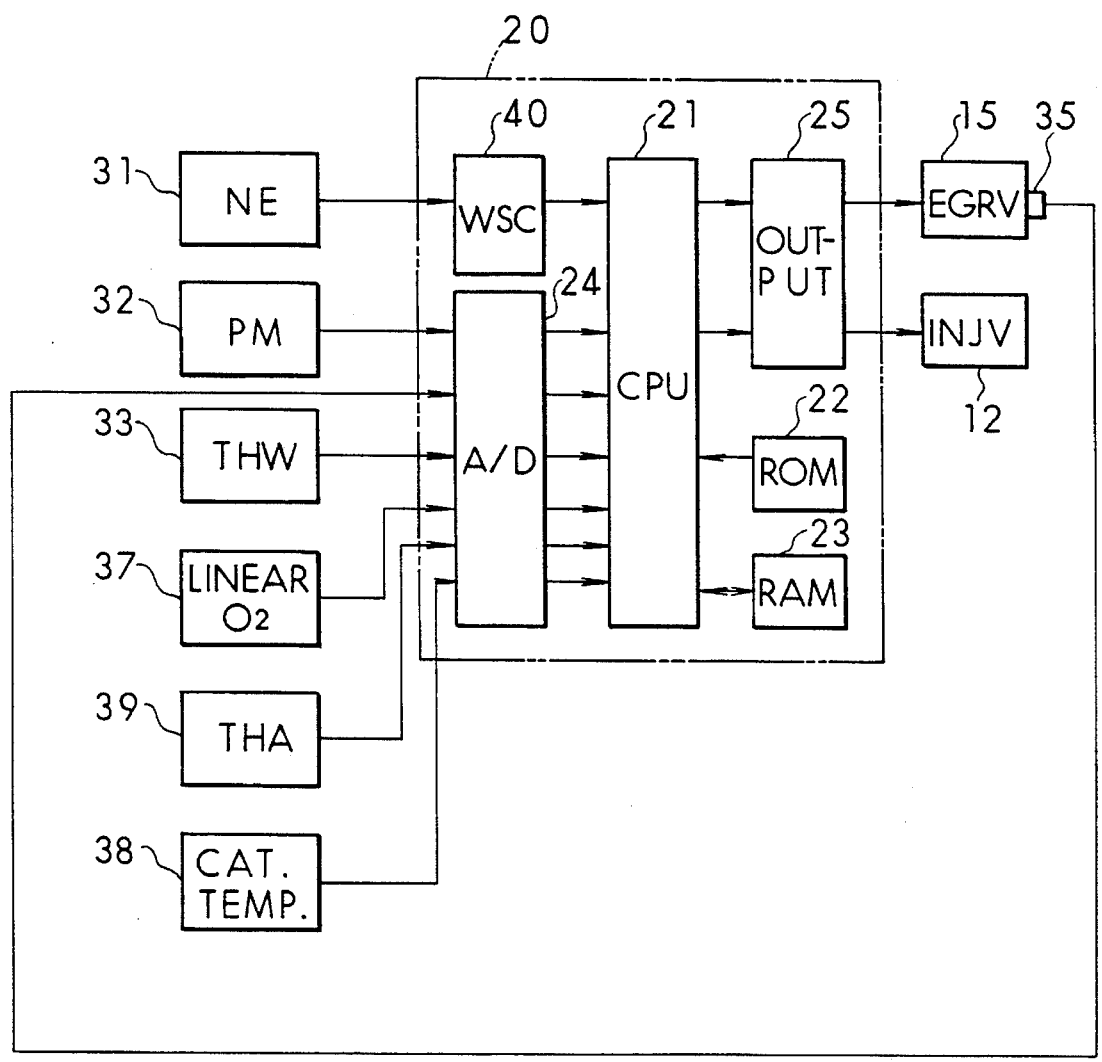
FIG. 20 is a block diagram of a second embodiment of the internal combustion engine control apparatus of the invention.
Figure 21A:
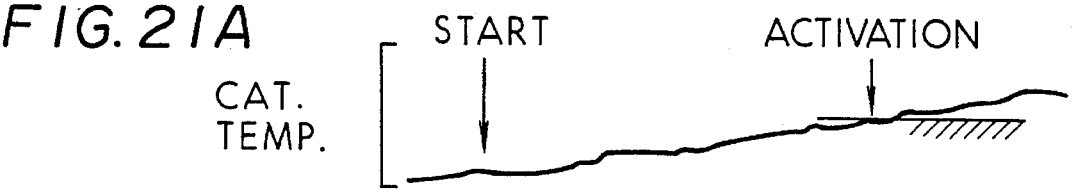
FIGS. 21A to 21E are timing charts regarding the second embodiment.
Figure 21B:
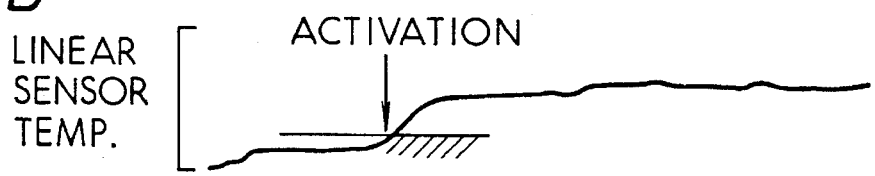
Figure 21C:
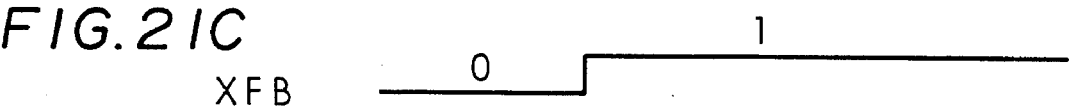
Figure 21D:
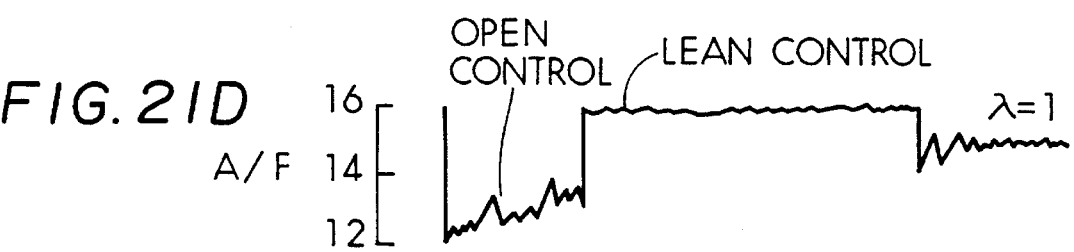
Figure 21E:
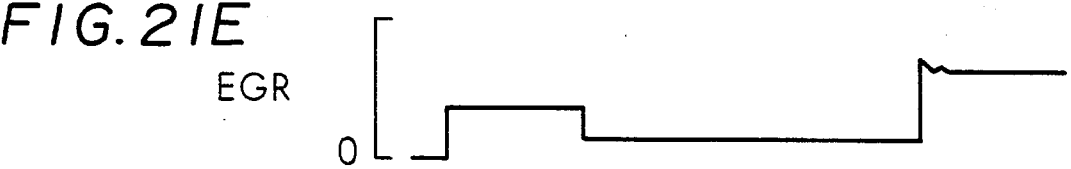

While the O$_2$ sensor 34 according to the first embodiment outputs 1.0 V or 0 V with reference to a predetermined O$_2$ concentration level, a second embodiment employs a linear O$_2$ sensor 37 that linearly detects the O$_2$ concentration, and a catalyzer temperature sensor 38 that detects the temperature of a catalyzer provided in an exhaust pipe 13 as shown in FIG. 20.

The second embodiment determines whether to activate the linear O$_2$ sensor 37, and determines whether the catalyzer has been activated based on the temperature detected by the catalyzer temperature sensor 38, to perform optimal control in three different modes selectively for a period from the start of engine operation until the linear O$_2$ sensor 37 becomes activated, and a period from the activation of the linear O$_2$ sensor 37 until the catalyzer becomes activated, and after the activation of the catalyzer, as indicated in the timing charts of FIGS. 21A to 21E. The activation status of the catalyzer can be determined not only based on the output from the temperature sensor but also based on the length of time that elapses from the start of engine operation. The activation status of the linear O$_2$ sensor 37 is determined by monitoring the element impedance under a predetermined applied voltage (for example, a battery voltage of 14V). This is based on a fact that the element impedance of the linear O$_2$ sensor 37 changes depending on the temperature of the sensor 37 (heater temperature+exhaust gas temperature).

For the period from the engine operation start until the activation of the linear O$_2$ sensor 37, open-loop air-fuel ratio control and EGR control in accordance with the open-loop air-fuel ratio control are performed as in the first embodiment. For the period from the activation of the linear O$_2$ sensor 37 until the activation of the catalyzer, feedback air-fuel ratio control is performed to achieve a fuel-lean ratio (for example, A/F=16.0). By maintaining the air-fuel ratio to the lean side, exhaust gas components HC and CO can be reduced.

Figure 22:
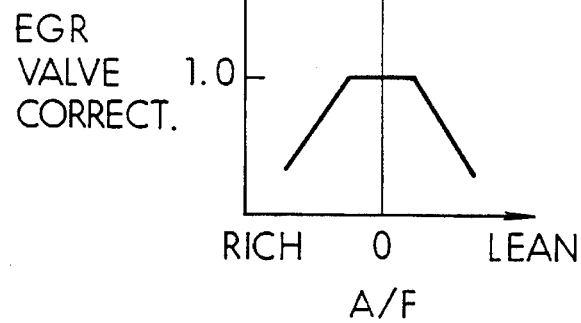
FIG. 22 is a graph indicating characteristics of the correction coefficient regarding the second embodiment.

The EGR control according to this embodiment considers deviation of the air-fuel ratio from the stoichiometric ratio ($\lambda$=1, or A/F=14.7) caused by the above-described lean air-fuel ratio control. For example, if the target air-fuel ratio is 16.0, then the deviation is 16.0−14.7=1.3 ($\Delta$A/F). The EGR flow is corrected by reducing the EGR flow in accordance with the amount of A/F deviation as indicated in FIG. 22. The engine operation can be stabilized by thus reducing the EGR flow. This EGR control will reduce an exhaust gas component, NOx. Thus, the air-fuel ratio control and the EGR control according to Embodiment 2 achieve both stabilization of engine operation and reduction of three major exhaust gas components, HC, CO and NOx.

Embodiment 3

For the period from the engine operation start until the activation of the O$_2$ sensor, each of the first and second embodiments performs the open-loop air-fuel ratio control using a map to retrieve data, and the EGR control by retrieving target EGR valve opening data from a map predetermined in accordance with the open-loop air-fuel ratio control.

Figure 23A:
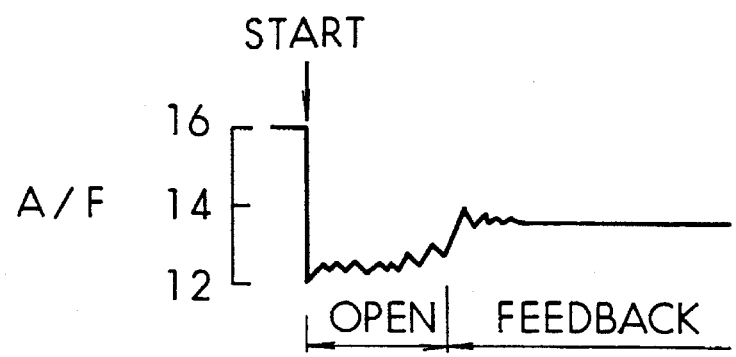
FIGS. 23A to 23D are timing charts regarding a third embodiment of the internal combustion engine control apparatus of the invention.
Figure 23B:
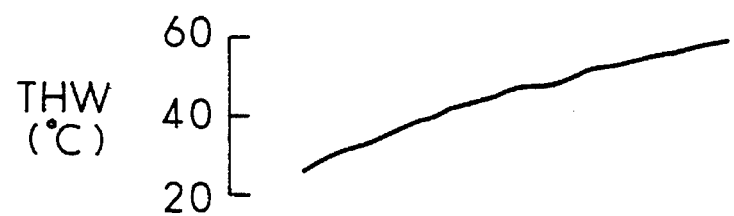
Figure 23C:
Figure 23D:
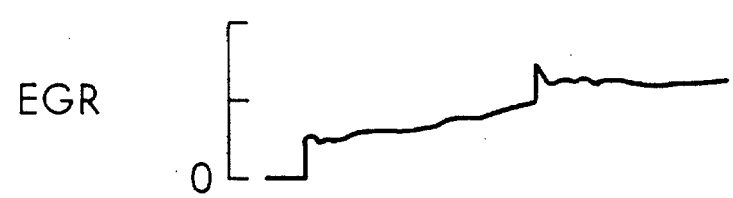
Figure 24:
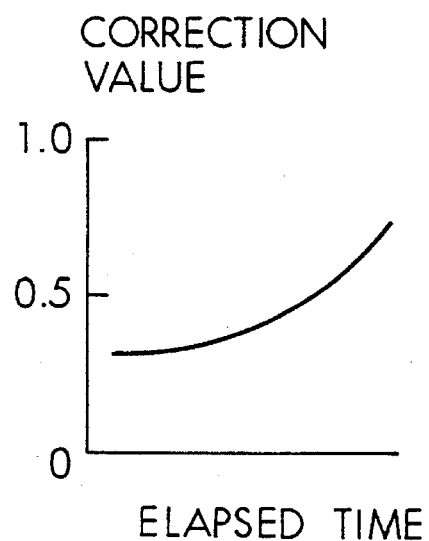
FIG. 24 is a graph indicating characteristics of the correction coefficient according to the third embodiment.

The air-fuel ratio actually changes gradually from the rich side to the lean side during an initial period following the start of engine operation as indicated in FIG. 23A. This change pattern is generally uniform. Based on an assumption that the air-fuel ratio follows this change pattern during the initial period, a third embodiment employs a correction map corresponding to the length of time that elapses after the engine start as shown in FIG. 24, to achieve optimal EGR flow. The EGR valve opening is determined by using a correction value retrieved from the correction map based on the length of time that elapses after the engine start and the coolant temperature.

Embodiment 4

A fourth embodiment further employs an air mixing function that includes air supplying function, to reduce the particle size of sprayed fuel. Thereby, combustion in low temperature is further stabilized, leading to enhancement of the aforementioned advantages of the invention.

While the present invention has been described with reference to what are presently considered to be preferred embodiments thereof, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An internal combustion engine control apparatus having an $O_2$ sensor for detecting $O_2$ concentration in exhaust gas in an exhaust system of an engine in order to perform air-fuel ratio control and an exhaust gas recirculation valve for communicating the exhaust system with an intake system in order to perform exhaust gas recirculation control, the apparatus comprising:

promoting means for promoting activation of the $O_2$ sensor;

determining means for determining whether the $O_2$ sensor is activated;

air-fuel ratio control means for performing air-fuel ratio control in a non-feedback control mode without using feedback of $O_2$ concentration information during a period from start of the engine until activation of the $O_2$ sensor, and in a feedback control mode with feedback of $O_2$ concentration information in accordance with a change in the air-fuel ratio after activation of the $O_2$ sensor, based on a determination made by the determining means; and exhaust gas recirculation control means for performing exhaust gas recirculation control preset in accordance with switching over of the control modes of the air-fuel ratio control means, based on the determination made by the determining means.

2. An internal combustion engine control apparatus according to claim 1, wherein after activation of the $O_2$ sensor, the air-fuel ratio control means performs the feedback air-fuel ratio control to achieve a stoichiometric air-fuel ratio in accordance with an output from the $O_2$ sensor.

3. An internal combustion engine control apparatus according to claim 1, wherein the exhaust gas recirculation control means includes means for performing exhaust gas recirculation control in accordance with a predetermined air-fuel ratio change pattern during the period from start of the engine until activation of the $O_2$ sensor, based on determination made by the determining means.

4. An internal combustion engine control apparatus according to claim 1, wherein the exhaust gas recirculation control means comprises:

coolant temperature detecting means for detecting temperature of coolant of the engine; and correcting means for, in a first case where a coolant temperature detected by the coolant temperature detecting means is higher than a first predetermined temperature and in a second case where a coolant temperature detected by the coolant temperature detecting means is lower than a second predetermined temperature, correcting exhaust gas recirculation flow by reducing the flow to a level lower than a level that occurs in a case other than the first and second cases regarding coolant temperature, based on the coolant temperature detected.

5. An internal combustion engine control apparatus having a catalyzer provided in an exhaust system of an engine for reducing a harmful exhaust gas component, an $O_2$ sensor for detecting $O_2$ concentration in exhaust gas in the exhaust system in order to perform air-fuel ratio control, and an exhaust gas recirculation valve for communicating the exhaust system with an intake system in order to perform exhaust gas recirculation control, the apparatus comprising:

promoting means for promoting activation of the $O_2$ sensor, the $O_2$ sensor being a linear $O_2$ sensor that substantially linearly detects $O_2$ concentration;

sensor activation determining means for determining whether the $O_2$ sensor is activated;

catalyzer activation determining means for determining whether the catalyzer is activated;

air-fuel ratio control means for performing air-fuel ratio control in a non-feedback control mode without using feedback of $O_2$ concentration information during a period from start of the engine until activation of the $O_2$ sensor, in a feedback control mode with feedback of $O_2$ concentration information to maintain the air-fuel ratio to a fuel-lean side in accordance with a change in the air-fuel ratio during a period after activation of the $O_2$ sensor until activation of the catalyzer, and in another feedback control mode with feedback of $O_2$ concentration information to achieve a stoichiometric air-fuel ratio in accordance with a change in the air-fuel ratio after activation of the catalyzer, based on determination made by the sensor activation determining means and the catalyzer activation determining means; and exhaust gas recirculation control means for performing exhaust gas recirculation control in accordance with switching over of control modes of the air-fuel ratio control means, based on determination made by the sensor activation determining means and the catalyzer activation determining means.

6. An internal combustion engine control apparatus according to claim 5, wherein the exhaust gas recirculation control means includes means for performing exhaust gas recirculation control in accordance with a predetermined air-fuel ratio change pattern during the period from start of the engine until activation of the $O_2$ sensor, based on determination made by the determining means.

7. An internal combustion engine control apparatus according to claim 5, wherein the exhaust gas recirculation control means comprises:

coolant temperature detecting means for detecting temperature of coolant of the engine; and correcting means for, in a first case where a coolant temperature detected by the coolant temperature detecting means is higher than a first predetermined temperature and in a second case where a coolant temperature detected by the coolant temperature detecting means is lower than a second predetermined temperature, correcting exhaust gas recirculation flow by reducing the flow to a level lower than a level that occurs in a case other than the first and second cases regarding coolant temperature, based on the coolant temperature detected.

8. An internal combustion engine control apparatus having an $O_2$ sensor for detecting $O_2$ concentration in exhaust gas in an exhaust system of an engine, the apparatus comprising:

determining means for determining whether the $O_2$ sensor is activated; and exhaust gas recirculation control means for performing exhaust gas recirculation control in accordance with a predetermined air-fuel ratio change pattern during a period from start of the engine until activation of the $O_2$ sensor, based on determination made by the determining means.

9. An internal combustion engine control apparatus according to claim 8, wherein the exhaust gas recirculation control means comprises:

coolant temperature detecting means for detecting temperature of coolant of the engine; and correcting means for, in a first case where a coolant temperature detected by the coolant temperature detecting means is higher than a first predetermined temperature and in a second case where a coolant temperature detected by the coolant temperature detecting means is lower than a second predetermined temperature, correcting exhaust gas recirculation flow by reducing the flow to a level lower than a level that occurs in a case other than the first and second cases regarding coolant temperature, based on the coolant temperature detected.

\* \* \* \* \*